United States Patent [19]

Kawada et al.

[11] Patent Number: 4,787,709
[45] Date of Patent: Nov. 29, 1988

[54] OPTICAL FIBER HAVING GLASS CORE AND FLUORO-COPOLYMER CLADDING

[75] Inventors: Akira Kawada, Tokyo; Takashi Yasumura, Fujimi; Toshio Koishi, Sakado, all of Japan

[73] Assignee: Central Glass Company, Limited, Ube, Japan

[21] Appl. No.: 826,588

[22] Filed: Feb. 6, 1986

[30] Foreign Application Priority Data

Feb. 20, 1985 [JP]  Japan ................................. 60-30622

[51] Int. Cl.$^4$ .............................................. G02B 6/16
[52] U.S. Cl. ................................. 350/96.34; 427/163; 428/391
[58] Field of Search .............. 350/96.34, 96.29, 96.30; 428/364, 391, 394, 395, 373; 427/163

[56] References Cited

U.S. PATENT DOCUMENTS

| | | | |
|---|---|---|---|
| 3,993,834 | 11/1976 | Chimura et al. | 350/96.34 |
| 4,264,129 | 4/1981 | Warkentine | 350/96.34 |
| 4,353,960 | 10/1982 | Endo et al. | 428/373 |
| 4,381,269 | 4/1983 | Kaino et al. | 350/96.34 |
| 4,505,543 | 3/1985 | Ueba et al. | 350/96.34 |
| 4,542,957 | 9/1985 | Ishiwari et al. | 350/96.34 |
| 4,544,235 | 10/1985 | Nishida et al. | 350/96.34 |
| 4,552,431 | 11/1985 | Allemand et al. | 350/96.34 |
| 4,564,263 | 1/1986 | Ueba et al. | 350/96.34 |
| 4,566,755 | 1/1986 | Ohmori et al. | 350/96.34 |
| 4,593,974 | 6/1986 | Yamamoto et al. | 350/96.34 |
| 4,615,584 | 10/1986 | Ohmori et al. | 350/96.34 |
| 4,687,295 | 8/1987 | Koishi et al. | 350/96.29 X |

FOREIGN PATENT DOCUMENTS

| | | |
|---|---|---|
| 51-52849 | 5/1976 | Japan . |
| 59-111104 | 6/1984 | Japan ............................... 350/96.29 |
| 1037498 | 7/1966 | United Kingdom . |
| 2161954 | 1/1986 | United Kingdom . |
| 2171219 | 8/1986 | United Kingdom . |

OTHER PUBLICATIONS

Shirley et al., "Acetone" and Propylene, *McGraw-Hill Encyclopedia of Science and Technology*, vol. 1, pp. 40–41, vol. 11, p. 18, 1982.

*Primary Examiner*—John D. Lee
*Attorney, Agent, or Firm*—Fleit, Jacobson, Cohn & Price

[57] ABSTRACT

The invention relates to an optical fiber of the step-index type using quartz glass or an inorganic optical glass as the core material and a fluorine-containing resin as the cladding material. A copolymer of vinylidene fluoride with hexafluoroacetone, preferably at a molar ratio in the range from 96:4 to 88:12, is employed as the cladding material. Using such a copolymer, a highly transparent and very strong and tough cladding layer can easily be formed by a solution coating method.

5 Claims, 1 Drawing Sheet

OPTICAL FIBER HAVING GLASS CORE AND FLUORO-COPOLYMER CLADDING

BACKGROUND OF THE INVENTION

This invention relates to an optical fiber of the step-index type in which the core material is an inorganic glass and the cladding material a vinylidene fluoride base copolymer.

There is no doubt about a very important role of optical communications in the recent and future highly information-oriented society. A key element in an optical communication system is optical fiber. In the light communication systems already put to practical use and particularly in the long distance and high capacity communication systems, quartz or silica base glass is the most prevailing material for optical fibers mainly because of low transmission loss in such glass.

Recently some kinds of organic plastics optical fibers have also been developed mostly by using a methacrylic resin as the core material. Advantages of plastics optical fibers reside in the ease of fabrication and processing and the feasibility for considerable enlargement of optical fiber diameters. However, plastics optical fibers are, and will probably remain inferior to inorganic glass optical fibers in respect of transmission loss. Therefore, practical applications of plastics optical fibers have been limited to short distance transmissions mostly for display purposes.

In view of such merits and demerits of inorganic optical fibers and organic optical fibers, increasing interest has been attached to the third category of optical fibers which are of a composite type using a silica base glass as the core material and an organic polymer as the cladding material. The composite type optical fibers are lower in transmission loss than the organic optical fibers and, besides, might be less costly. Accordingly the composite type optical fibers are expected to have wide applications to short and medium distance communications particularly in the fields of office automation and factory automation.

In the composite type optical fibers quartz glass will be preferred as the core material because of its excellence in light transmittance. Since quartz glass is relatively low in refractive index (about 1.458), the organic polymer as the cladding material must be selected among limited kinds of synthetic resins that have low refractive indices and is usually selected from silicone resins and fluorine-containing resins. The cladding of a quartz glass core with an organic polymer is accomplished by an extrusion method or a solution coating method depending on the properties of the selected polymer. For example, Japanese patent application primary publication No. 51-52849 (1976) shows an optical fiber of the step-index type in which the core material is either quartz glass or an inorganic optical glass and the cladding material a copolymer of tetrafluoroethylene with vinylidene fluoride. This cladding material is suited to both extrusion and solution coating.

For a practicable optical fiber of the composite type the following items are required of the organic cladding material: (1) to be sufficiently low in refractive index, (2) to be high in transparency and preferably transmissive to visible light, (3) to be good in adhesion to the core glass, (4) to be low in crystallinity, (5) to be higher than about 100° C. in thermosoftening temperature, (6) to be capable of providing a tough and flexible coating film, (7) to be chemically stable, (8) to be high in weatherability and (9) to be obtained at low cost.

Since large demands for optical fibers for short and medium distance communications are expected, it is also a matter of primary importance for the composite type optical fibers to be fabricated by a simple, efficient and economical cladding method. In this regard, a solution coating method is advantageous over an extrusion method because the core filament drawing operation and the cladding operation can be performed successively at the same station and also because the thickness of the cladding can be reduced. For a practical solution coating operation it is desirable that the cladding material be well soluble in a commonplace solvent that has a relatively low boiling point and is free of or weak in toxicity.

Another matter of importance for the composite type optical fibers is that the cladding layer does not need to be further coated with a protective layer. That is, the cladding layer should be untacky and sufficiently strong. In general silicone resins do not meet this requirement. Besides, cladding with a silicone resin is relatively low in productivity even though a solution coating method can be employed because a curing step must be incorporated.

SUMMARY OF THE INVENTION

It is an object of the present invention to provide an optical fiber of the step-index type in which the core material is an inorganic glass and the cladding material is an organic polymer and which possesses well balanced properties including toughness and untackiness of the cladding and can be produced by using a solution coating method.

The present invention provides an optical fiber of the step-index type, which consists of a solid cylindrical core formed of an inorganic glass and a cladding layer which is in close contact with the core and is formed of a copolymer of vinylidene fluoride and hexafluoroacetone.

The inorganic glass as the core material may be either quartz glass or a multicomponent optical glass. In the copolymer employed as the cladding material, a preferred range of the molar ratio of vinylidene fluoride (VDF) to hexafluoroacetone (HFA) is from 96:4 to 88:12. Such a VDF/HFA copolymer is low in crystallinity and high in transparency and flexibility and has a melting point higher than 100° C.

The cladding of the glass core with a VDF/HFA copolymer can easily be accomplished by a solution coating method since the copolymer is well soluble in organic solvents convenient for practical use. In the resultant optical fiber, very good and firm adhesion is established at the core-cladding interface so that the optical fiber can withstand bending and constrictive stroking. The VDF/HFA copolymer cladding is a sufficiently hard, tough and untacky coating film. Accordingly this optical fiber can be practically used without providing it with a protective coating or covering, and it is possible to bundle a plurality of optical fiber filaments of the invention with the cladding layer of each optical fiber filament exposed.

An optical fiber according to the invention is useful over a wide range of wavelength including ultraviolet and visible regions. In this optical fiber transmission loss is less than 200 dB/km in most cases. The cladding layer of this optical fiber is sufficient in thermal stability and also in resistance to acid and alkali. Furthermore, this cladding layer is excellent in weatherability.

DESCRIPTION OF THE PREFERRED EMBODIMENTS

Figures 1, 2:
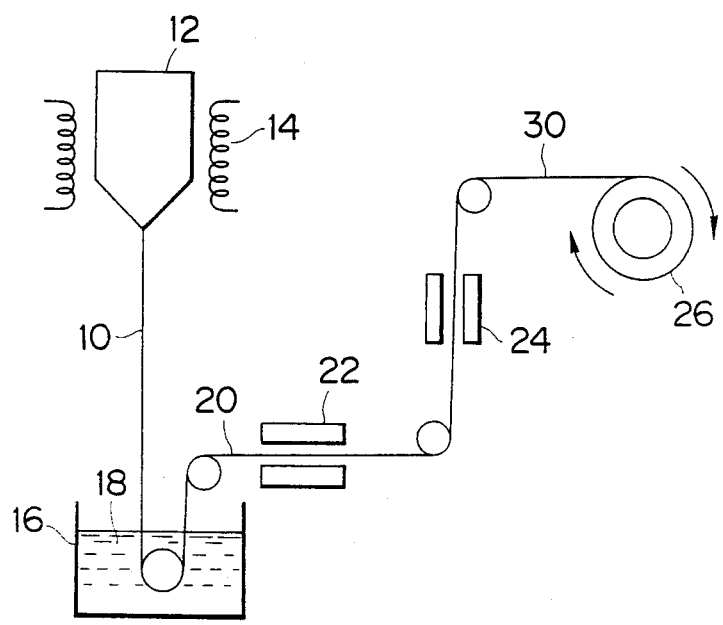
FIG. 1 is an explanatorily enlarged crosssectional view of an optical fiber according to the invention.
FIG. 2 is a diagrammatic illustration of an apparatus used for producing an optical fiber according to the invention.

As shown in FIG. 1, an optical fiber according to the invention consists of a cylindrical core 10 formed of an inorganic glass and a cladding layer 15 which is formed of a VDF/HFA copolymer and has a substantially uniform thickness over the entire cylindrical surface of the core 10. Either quartz glass or an optical glass, which is usually higher in refractive index than quartz glass, is used as the material of the core 10.

A copolymer of VDF with HFA is the cladding material characteristic of an optical fiber of the invention. In this copolymer a preferred range of the molar ratio of VDF to HFA is from 96:4 to 88:12. Within this range of VDF/HFA ratio, the refractive index of the copolymer falls in the range from 1.407 to 1.384 and the melting point in the range from about 115° C. to about 165° C. As the proportion of HFA increases the copolymer becomes more transparent and more flexible. However, when the amount of HFA is increased beyond 12 mol % the melting point or softening temperature of the copolymer becomes lower than 115° C. and further lowers to below 100° C. When the cladding 15 is so low in heat resistance considerable restrictions are placed on the use of the optical fiber. On the other hand, when the amount of HFA is less than 4 mol % the copolymer is not suitable as the cladding material because of insufficient transparency which is attributed to increased crystallinity.

A suitable VDF/HFA copolymer can be prepared by a radical copolymerization reaction, which is carried out in an organic liquid medium in the presence of an oil-soluble radical polymerization initiator usually at a temperature in the range from about 0° C. to about 70° C. As the organic liquid medium, either a saturated hydrocarbon such as n-hexane or n-heptane, for example, or a fluorine-containing solvent such as trichlorotrifluoroethane or dichlorotetrafluoroethane can be used. At the end of the copolymerization reaction the reaction system is in the form of slurry containing a precipitated copolymer. Therefore, a VDF/HFA copolymer powder is easily obtained by filtering and drying operations. The obtained copolymer is very low in the contents of impurities since the reaction system does not contain extra additives other than the liquid medium and the initiator.

VDF/HFA copolymers containing at least 4 mol % of HFA are highly soluble in commonly used organic solvents. In the present invention a solution of a VDF/HFA copolymer in an organic solvent is used to form the cladding layer 15 of the optical fiber by a solution coating method. So long as the molar ratio of VDF to HFA is appropriate, every cast film or coating film obtained from a VDF/HFA copolymer solution is a transparent and untacky film having an adequate hardness and good mechanical strength. Such films of VDF/HFA copolymers have no absorption in the ultraviolet and visible regions of the spectrum ranging from 200 to 800 nm. Therefore, this invention can provide an optical fiber which is low in transmission loss over a wide range of wavelength.

In the fabrication of an optical fiber of the invention, the organic solvent for dissolving a VDF/HFA copolymer is usually selected from ketones such as acetone, methylethyl ketone and cyclohexanone, acetic esters such as methyl acetate, ethyl acetate and n-butyl acetate and cyclic ethers such as tetrahydrofuran and dioxane. In the solution a suitable range of the concentration of the dissolved VDF/HFA copolymer is from 2 to 30% by weight.

In regard to the viscosity of the VDF/HFA copolymer solution, it is desirable that the intrinsic viscosity ($\eta$) of solution of the same copolymer in N,N-dimethylacetamide at 30° C. falls in the range from 0.5 to 2.0 dl/g, and such desire can be met by limiting the copolymerization ratio of VDF to HFA within the aforementioned range. When the intrinsic viscosity is lower than 0.5 dl/g the cladding layer 15 formed by the solution coating method will be insufficient in mechanical strength. When the intrinsic viscosity is higher than 2.0 dl/g the solution coating operation cannot smoothly be accomplished due to excessively high viscosity of the coating solution.

The core 10 of either quartz glass or an optical glass is produced by a well known melt spinning method. Preferably soon after the melt spinning operation, the glass Core 10 in the form of a long filament is passed through a coating tank containing a VDF/HFA copolymer solution. After that drying is carried out at a temperature below the melting point of the VDF/HFA copolymer until complete evaporation of the organic solvent used to dissolve the copolymer. In principle, the formation of the cladding layer 15 is completed by these operations. However, it is possible to further enhance transparency of the cladding 15 by subjecting the already dried cladding 15 to a heat treatment at a temperature somewhat above the melting point of the VDF/HFA copolymer, viz. at about 120°–170° C.

The invention will further be illustrated by the following nonlimitative examples.

EXAMPLE 1

(1) Preparation of VDF/HFA copolymer

First 17 liters of 1,1,2-trichloro-1,2,2-trifluoroethane and 150 g of 4.5 wt % solution of hexafluorobutyryl peroxide in 1,1,2-trichloro-1,2,2-trifluoroethane were charged in a 34-liter stainless steel autoclave, which was provided with a stirrer and was dried in advance. After completely replacing the gas atmosphere in the autoclave by nitrogen gas, the pressure in the autoclave was adjusted to and kept at 200 mmHg. Then 1655 g of HFA monomer and 1690 g of VDF monomer were introduced into the autoclave. Operating the stirrer, the monomers in the autoclave were subjected to radical copolymerization reaction at 20° C. for 24 hr. After the reaction unreacted portions of the monomers were removed, and the slurry containing the precipitated copolymer was filtered and the separated precipitate was dried under vacuum at about 60° C. The yield of the VDF/HFA copolymer obtained in powder form was 49%.

In this copolymer the molar ratio of VDF to HFA was determined to be 91.0:9.0 by elementary analysis, and the melting point of the copolymer was measured to be 122° C. by differential scanning calorimetry. The intrinsic viscosity (η) of the copolymer in N,N-dimethylacetamide was 1.10 dl/g at 30° C.

A cast film of the VDF/HFA copolymer was produced by using a solution in tetrahydrofuran. The film was colorless and transparent. By measurement of the copolymer film with an absorption spectrometer for ultraviolet and visible regions, no absorption was observed within the wavelength range from 200 to 860 nm. The refractive index of the copolymer film was measured to be 1.393 with Abbe's refractometer of Type 2 using the D-line of sodium and methyl salicylate as the intermediate liquid.

The VDF/HFA copolymer proved to be stable to both acid and alkali when tested generally in accordance with ASTM D 543. In an accelerated weathering test using a sunshine weather-O-meter, no change was observed in the appearance of the copolymer samples after the lapse of 2000 hr.

(2) Fabrication of Optical Fiber

Referring to FIG. 2, a quartz glass filament 10 having a diameter of 125 μm was produced by using a melt spinning aparatus including a melting vessel 12 and a high frequency induction furnace 14. The glass filament 10 was guided into a solution coating tank 16 which was placed right below the spinning apparatus at a vertical distance of 3 m. The coating solution 18 in the tank 16 was 15 wt % solution of the VDF/HFA copolymer prepared in this example in ethyl acetate. At 27° C. the viscosity of the coating solution 18 was 150 cp. The wet filament 20 was passed through a drier 22 maintained at 60°–70° C. for evaporating the solvent. After that the glass filament coated with the copolymer was once heated to 150° C. in a heat treatment apparatus 24. By natural cooling to room temperature the fabrication of an optical fiber 30 according to the invention was completed. Indicated at 26 is a winder to wind the optical fiber 30 around a bobbin.

In the optical fiber produced by the above process, the cladding layer 15 of the VDF/HFA copolymer had an average thickness of 10 μm. In every cross-section the copolymer cladding 15 was in very close contact with the quartz glass core 10 with no indication of peel or any other defect. When this optical fiber was tested by using a He-Ne laser which radiates at 6238 Å, the transmission loss was 120 dB/km.

EXAMPLE 2

An optical fiber was produced by the same method as in Example 1 except the following modifications.

In this case the quartz glass filament 10 as the core material had a diameter of 375 μm, and the coating solution 18 was 20 wt % solution of the VDF/HFA copolymer prepared in Example 1 in a mixture of 95 parts by weight of ethyl acetate and 5 parts by weight of cyclohexanone. At 27° C. the viscosity of the coating solution was 450 cp.

In the optical fiber produced in this example the cladding layer 15 of the VDF/HFA copolymer had an average thickness of 14 μm. The cladding 15 was in very close contact with the quartz glass core 10, and the optical fiber samples endured bending and constrictive stroking without showing indications of cracking or peeling of the cladding. When this optical fiber was tested by using the 6238 Å He-Ne laser the transmission loss was 86 dB/km.

What is claimed is:

1. An optical fiber of the step-index type comprising:
   a solid cylindrical core which is formed of an inorganic glass; and
   a cladding layer which is in close contact with said core and is formed of a copolymer of vinylidene fluoride with hexafluoroacetone wherein the molar ratio of vinylidene fluoride to hexafluoroacetone in said copolymer is in the range from 96:4 to 88:12.

2. An optical fiber according to claim 1, wherein said inorganic glass is quartz glass.

3. An optical fiber according to claim 1, wherein said inorganic glass is an optical glass.

4. An optical fiber according to claim 1, wherein said cladding layer is formed by a solution coating method using a solution of said copolymer in an organic solvent.

5. An optical fiber according to claim 4, wherein the intrinsic viscosity of a solution of said copolymer in N,N-dimethylacetamide at 30° C. is in the range from 0.5 to 2.0 dl/g.

* * * * *